(12) United States Patent
Kato et al.

(10) Patent No.: US 6,283,264 B1
(45) Date of Patent: Sep. 4, 2001

(54) HYDRAULIC POWER TRANSMISSION JOINT

(75) Inventors: Tadahiko Kato; Kazuhisa Shimada; Hiroyuki Nakano; Kiyonori Hirao; Yoshiaki Tajima, all of Shizuoka; Toshiharu Takasaki, Kanagawa; Hirotaka Kusukawa, Machida; Shigeo Murata, Kanagawa, all of (JP)

(73) Assignees: Fujiunivance Co., Shizuoka; Nissan Motor Co., Ltd., Kanagawa, both of (JP)

( * ) Notice: Subject to any disclaimer, the term of this patent is extended or adjusted under 35 U.S.C. 154(b) by 0 days.

(21) Appl. No.: 09/553,016

(22) Filed: Apr. 20, 2000

(30) Foreign Application Priority Data

Apr. 23, 1999 (JP) .................................... 11-116420

(51) Int. Cl.⁷ ........................................................ F16D 31/00
(52) U.S. Cl. .............................................. 192/59; 464/27
(58) Field of Search .............................. 192/59, 103 FA; 60/413, 487; 91/485, 499; 464/27

(56) References Cited

U.S. PATENT DOCUMENTS

| | | |
|---|---|---|
| 3,913,715 | 10/1975 | Groves . |
| 5,037,353 * | 8/1991 | Suzuki et al. ............... 464/27 |
| 5,103,642 * | 4/1992 | Suzuki et al. ............... 60/413 |
| 5,297,994 * | 3/1994 | Suzuki et al. ............... 464/27 |
| 5,536,215 | 7/1996 | Shaffer et al. . |
| 5,706,658 | 1/1998 | Kato et al. . |
| 6,226,988 * | 5/2001 | Kato et al. ................... 60/487 |

FOREIGN PATENT DOCUMENTS

| | | |
|---|---|---|
| 8-193629 * | 7/1996 | (JP) . |
| 9-158963 * | 6/1997 | (JP) . |
| 10-110746 * | 4/1998 | (JP) . |

\* cited by examiner

*Primary Examiner*—Richard M. Lorence
(74) *Attorney, Agent, or Firm*—Wenderoth, Lind & Ponack, L.L.P.

(57) ABSTRACT

A torque characteristic shifting mechanism is provided in an accommodation hole of a rotary valve. The torque characteristic shifting mechanism changes over the torque characteristics in a multi-step manner with an increase of the vehicle velocity by setting the distances so as to meet the relationships $R3 \approx R2 > R1$ or $R2 > R3 > R1$ where $R1$, $R2$ and $R3$ are the distance from a center of rotation of a weight member accommodated rockably around the center of rotation to a center of the ball blocking the drain hole, the distance from the center of rotation to a center of gravity of the weight member and the distance from the center of rotation to a center of a spring, respectively.

6 Claims, 5 Drawing Sheets

HYDRAULIC POWER TRANSMISSION JOINT

BACKGROUND OF THE INVENTION

1. Field of the Invention

The present invention relates generally to a hydraulic power transmission joint for use in distribution of the driving force of a motor vehicle, and more particularly to a hydraulic power transmission joint capable of changing over the torque transmission characteristics in response to rotational-speed differences between two power shafts through the coupling thereof.

2. Description of the Related Arts

Conventional hydraulic power transmission joints are known from, e.g., U.S. Pat. Nos. 5,706,658 and 5,983,635.

To transmit torque in response to rotational-speed differences between two shafts, the hydraulic power transmission joint comprises:

- a cam housing interposed between the input and output shafts and coupled to one of the shafts, the cam housing being provided with a cam face having two or more raised portions formed on its internal side;
- a rotor coupled to the other of the shafts and rotatably housed in the cam housing, the rotor having a plurality of axially extending plunger chambers;
- a plurality of plungers each reciprocatively accommodated in each of the plurality of plunger chambers under a pressing force of a return spring, the plurality of plungers being operated by the cam face upon the relative rotations of the two shafts;
- an intake/discharge hole formed in the rotor and leading to the plurality of plunger chambers;
- a rotary valve being in rotatable sliding contact with an end face of the rotor, the rotary valve being positioned relative to the rotor in a predetermined relationship, the rotary valve having on its surface a plurality of intake ports and a plurality of discharge ports acting respectively as intake valves and discharge valves depending on a positional relationship relative to the intake/discharge hole;
- flow resistance generating means for generating flow resistance as a result of flow of oil discharged by the operation of the plungers.

Figure 1:
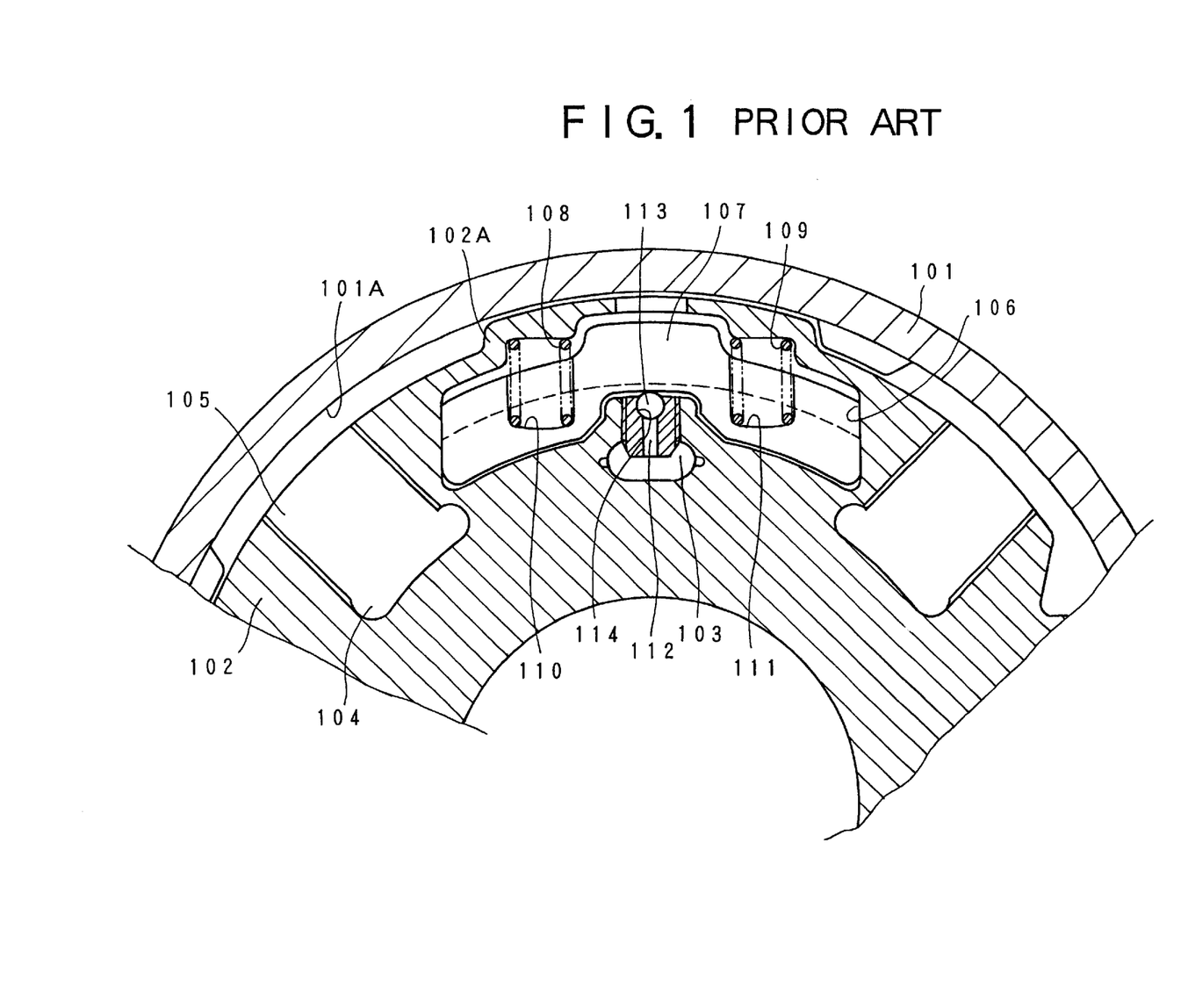
FIG. 1 is an explanatory diagram of a transmission torque switching apparatus under development by the inventors of this application.

In the event that tires having different diameters are mounted on the front and rear shafts with use of such a hydraulic power transmission joint, the rotational-speed difference and torque will increase accordingly as the vehicle velocity rises, and resultant cumulation of the vehicle front and rear differential torque may cause an increase in the running resistance. To solve such a problem, a torque characteristic shifting mechanism of FIG. 1 is proposed which includes therein a weight portion which is displaced against a retainer spring force in response to a vehicle velocity (centrifugal force) to thereby relieve the internal pressure to change over the transmission torque. FIG. 1 is a partial sectional view of a rotary valve of the hydraulic power transmission joint provided with the torque characteristic shifting mechanism. A rotary valve 102 is rotatably housed in a cam housing 101. The rotary valve 102 has on its outer periphery a positioning protrusion 102A which engages with a notch 101A formed in the inner periphery of the cam housing 101. The rotary valve 102 is provided with discharge ports 103 and intake ports 104 which are formed alternately in the circumferential direction, with the intake ports 104 leading to intake passages 105 extending to the outer peripheral surface of the rotary valve 102. An accommodation hole 106 is formed at the outer periphery of the rotary valve 102 outside the discharge ports 104. The accommodation hole 106 is in the shape of a circumferentially elongated hole having a raised portion formed on its bottom. The accommodation hole 106 accommodates a weight member 107 in such a manner as to be displaceable in the radial direction (centrifugal direction). The weight member 107 has a bottom which is shaped so as to correspond to the bottom of the accommodation hole 106 and which is provided with a recessed portion. The top of the weight member 107 is provided with spring accommodation holes 110 and 111 accommodating therein springs 108 and 109, respectively. A drain hole 112 is interposed between the accommodation hole 106 and the discharge port 103 so that the accommodation hole 106 and the discharge port 133 can communicate with each other by way of the drain hole 112. The drain hole 112 has at its exit an accommodation groove 114 for receiving a ball 113. The ball 113 is received in the accommodation groove 114 and normally blocks the drain hole 112. A predetermined gap is formed between the weight member 107 and the accommodation hole 106. The springs 108 and 109 press the weight member 107 by a given spring force. The ball 113 received in the accommodation groove 114 formed at the exit of the drain hole 112 blocks the drain hole 112 by the spring force of the springs 108 and 109, and when a predetermined vehicle velocity is reached and the weight member 107 is displaced in the centrifugal direction by the centrifugal force, the ball 113 opens the drain hole 112. In this manner, the conventional torque characteristic shifting mechanism allows the weight member 107 to be displaced against the springs 108 and 109 in response to the vehicle velocity (centrifugal force) so that the ball 113 opens the drain hole 112 to relieve the internal pressure, thereby rendering the torque $\Delta T$ variable as seen in FIG. 2.

Figure 2:
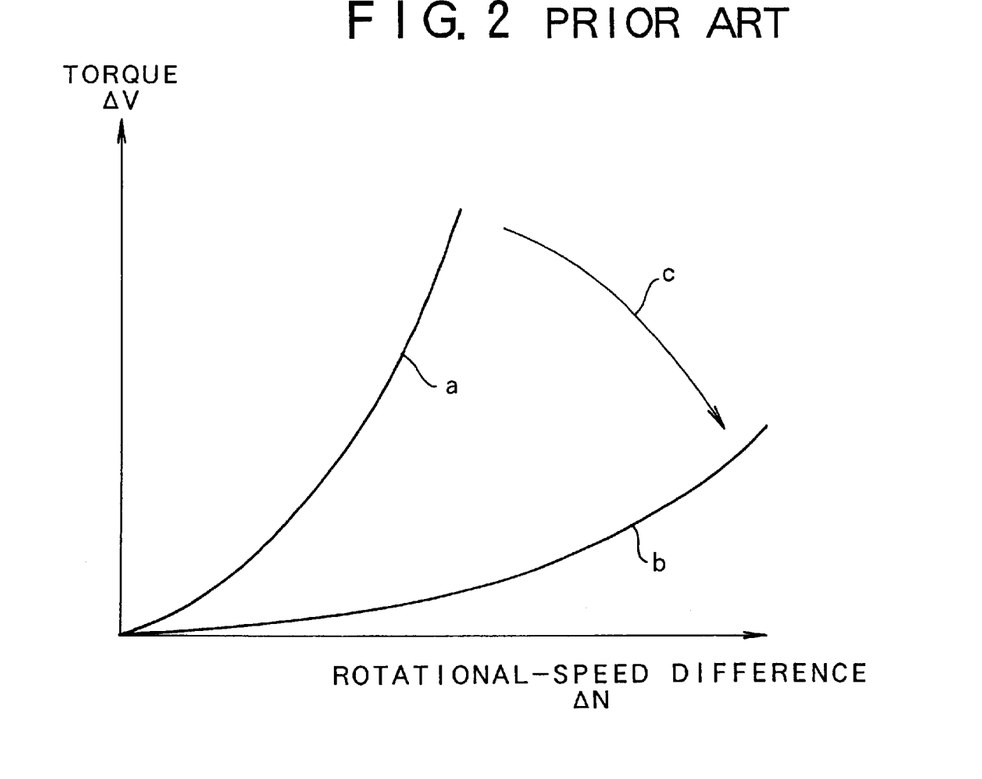
FIG. 2 is a graphical representation of the torque characteristics of FIG. 1.

In FIG. 2, a curve a represents a torque characteristic obtained when the vehicle velocity V has reached a predetermined vehicle velocity, and a curve b represents a torque characteristic obtained when the vehicle velocity V has reached a predetermined vehicle velocity V2. The transmission torque lowers depending on the vehicle velocity V as indicated by an arrow c, thereby preventing the running resistance from increasing.

Figure 3:
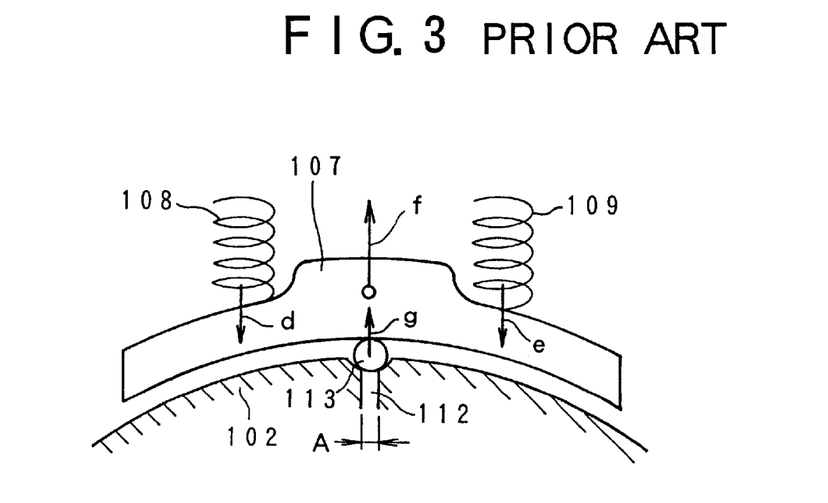
FIG. 3 is an explanatory diagram of the balance of a weight member of FIG. 1.

Referring then to FIG. 3, description will be made of the balance at a point where the torque characteristic is shifted. Arrows d and e denote a spring force P of the springs 108 and 109, an arrow f denotes a centrifugal force (mr $\omega^2$) acting on the weight member 107, and an arrow g denotes a thrust-up force ($\Delta P \cdot A$) by the internal oil pressure thrusting up the weight member 107 via the ball 113 in the centrifugal direction. A represents the area of contact of the ball 113 with the drain hole 112, and $\Delta P$ represents a discharge pressure. The discharge pressure $\Delta P$ is proportional to a transmission torque $\Delta T$ ($\Delta P$ $\Delta T$). The balance at the point (indicated by the vehicle velocity) at which the torque characteristic is changed over is therefore given as $$2P - m \cdot r \cdot \omega^2 - \Delta P \cdot A = 0, \ \omega^2 \ V^2$$

where m is a mass of the weight member;

$r \cdot \omega^2$ is an acceleration; and

V is a vehicle velocity.

Such a conventional hydraulic power transmission joint allowed the springs to press the opposed ends of the weight member, with the balance at the torque characteristic shifting point being given as $$2P - m \cdot r \cdot \omega^2 - \Delta P \cdot A = 0$$

hence it suffered deficiencies which follow.

First, although the balance expression results in 2P=ΔP·A when the vehicle velocity V is zero, a condition $\Delta P \geq P_0$ ($P_0$ is a predetermined pressure required for keeping the drain hole closed) needs to be satisfied in order to prevent any early drain, and it is also desirable to increase the area of contact A as much as possible with the aim of improving the fuel efficiency after shifting and of preventing any increase in the running resistance.

To acquire a larger contact area, the spring force has also to be increased. Due to the relationship that the spring force balances directly with the area of contact A, however, larger spring accommodation spaces are needed, resulting in the joint having a larger external diameter.

In the condition that ΔP·A is constant (ΔP·A=C), the balance expression is given as $$2P = m \cdot r \cdot \omega^2 + C$$

namely, $$\omega^2 = (2P \cdot C)/m \cdot r$$

For the purpose of improving the fuel efficiency after shifting and of suppressing any increase in the running resistance as described hereinabove, it is preferred to reduce the vehicle velocity V as much as possible. If the spring force P is constant, then it is preferred that the weight member have as large a mass m as possible. Due to the direct relationship of balance between m and other load, however, the overall length and the external diameter of the joint will increase, resulting in an enlarged joint.

In addition, due to the use of a single weight member for shifting the torque characteristic, the amount of torque reduction is apt to become larger after the torque shifting, which may adversely affect the variances in vehicle behaviors.

SUMMARY OF THE INVENTION

According to the present invention there is provided a hydraulic power transmission joint capable of remarkably reducing the spring accommodation space to achieve a reduction in dimensions of a joint and capable of preventing any variances in the vehicle behaviors.

The hydraulic power transmission joint of the present invention transmits torque in response to a rotational-speed difference between the input and output shafts capable of relative rotations. As used herein, the input and output shafts are front and rear shafts of a motor vehicle equipped with tires having different diameters and the joint serves to transmit Torque in response to the rotational-speed difference between the front and rear shafts which increases accordingly as the vehicle velocity increases.

The subject of the present invention is a hydraulic power transmission joint which transmits torque in response to a rotational-speed difference between the two shafts, the joint comprising:

a cam housing interposed between the input and output shafts capable of relative rotations and coupled to one of the shafts, the cam housing being provided with a cam face having two or more raised portions formed on its internal side;

a rotor coupled to the other of the shafts and rotatably housed in the cam housing, the rotor having a plurality of axially extending plunger chambers;

a plurality of plungers each reciprocatively accommodated in each of the plurality of plunger chambers under a pressing force of a return spring, the plurality of plungers being operated by the cam face upon the relative rotations of the two shafts;

an intake/discharge hole formed in the rotor and leading to the plurality of plunger chambers;

a rotary valve being in rotatable sliding contact with an end face of the rotor, the rotary valve being positioned relative to the rotor in a predetermined relationship, the rotary valve having on its surface a plurality of intake ports and a plurality of discharge ports acting respectively as intake valves and discharge valves depending on a positional relationship relative to the intake/discharge hole;

an orifice generating a flow resistance as a result of flow of oil discharged by the operations of the plungers.

The present invention is characterized in that such a hydraulic power transmission joint further comprises a torque characteristic shifting mechanism for changing over the torque transmission characteristics in a stepwise manner depending on a rotational-speed difference between the two shafts.

The torque characteristic shifting mechanism includes:

an accommodation hole formed outside of the discharge ports of the rotary valve;

a weight member received in the accommodation hole rockably around a center of rotation by the action of a centrifugal force;

a drain hole for allowing a communication between the accommodation hole and the discharge ports;

a ball located under the weight member for blocking the drain hole, the ball serving to open the drain hole when the weight member rocks by a centrifugal force; and a spring for urging the end portion of the weight member opposite to the center of rotation, the spring setting a predetermined rotational-speed difference as a torque characteristic changeover point.

Furthermore, the torque characteristic shifting mechanism may set the distances so as to meet a relationship R3≈R2>R1 or R2>R3>R1 where R1, R2 and R3 are the distance from the center of rotation to a center of the ball, the distance from the center of rotation to a center of gravity of the weight member and the distance from the center of rotation to a center of the spring, respectively.

The hydraulic power transmission joint of the present invention may comprise a plurality of torque characteristic shifting mechanisms each consisting of the accommodation hole, the weight member, the drain hole, the ball and the spring, so as to change over torque transmission characteristics at three or more steps in response to a rotational-speed difference between the two shafts.

For example, the hydraulic power transmission joint of the present invention may comprise a first torque characteristic shifting mechanism consisting of a first accommodation hole, a first weight member, a first drain hole, a first ball and a first spring; and a second torque characteristic shifting mechanism consisting of a second accommodation hole, a second weight member, a second drain hole, a second ball and a second spring, and wherein the first torque characteristic shifting mechanism sets a first rotational-speed difference (corresponding to the vehicle velocity V1) at which the torque characteristic is changed over by the action of the first spring pressing the end portion of the first weight member, and wherein the second torque characteristic shifting mechanism sets a second rotational-speed difference (corresponding to the vehicle velocity V2) higher than the first rotational-speed difference, at which the torque characteristic is changed over by the action of the second spring pressing the end portion of the second weight member.

According to the thus configured hydraulic power transmission joint of the present invention, the distances are set so as to meet the relationships R3≈R2>R1 or R2>R3>R1 where R1, R2 and R3 are the distance from the center of rotation of the weight member to the center of the ball blocking the drain hole, the distance from the center of rotation to the center of gravity of the weight member and the distance from the center of rotation to the center of the spring, respectively, R1/R3 will suffice for the spring force when the vehicle velocity is zero in order to obtain the same performances as the prior art, whereupon the spring accommodation space can be reduced to a great extent, achieving a reduction in size of the joint. Furthermore, R1/R2 will suffice for the mass of the weight member R2 when the thrust-up force lifting the ball is constant, so that the external diameter and the overall length can be reduced to a great extent, achieving a reduction in size of the joint. Moreover, the provision of a plurality of torque characteristic shifting mechanisms allows the torque characteristics to vary in a stepwise manner, thus preventing any variances in vehicle behaviors arising from torque variations.

The above and other aspects, objects, features and advantages of the present invention will become more apparent from the following detailed description with reference to the accompanying drawings.

DETAILED DESCRIPTION OF THE PREFERRED EMBODIMENT

Figure 4:
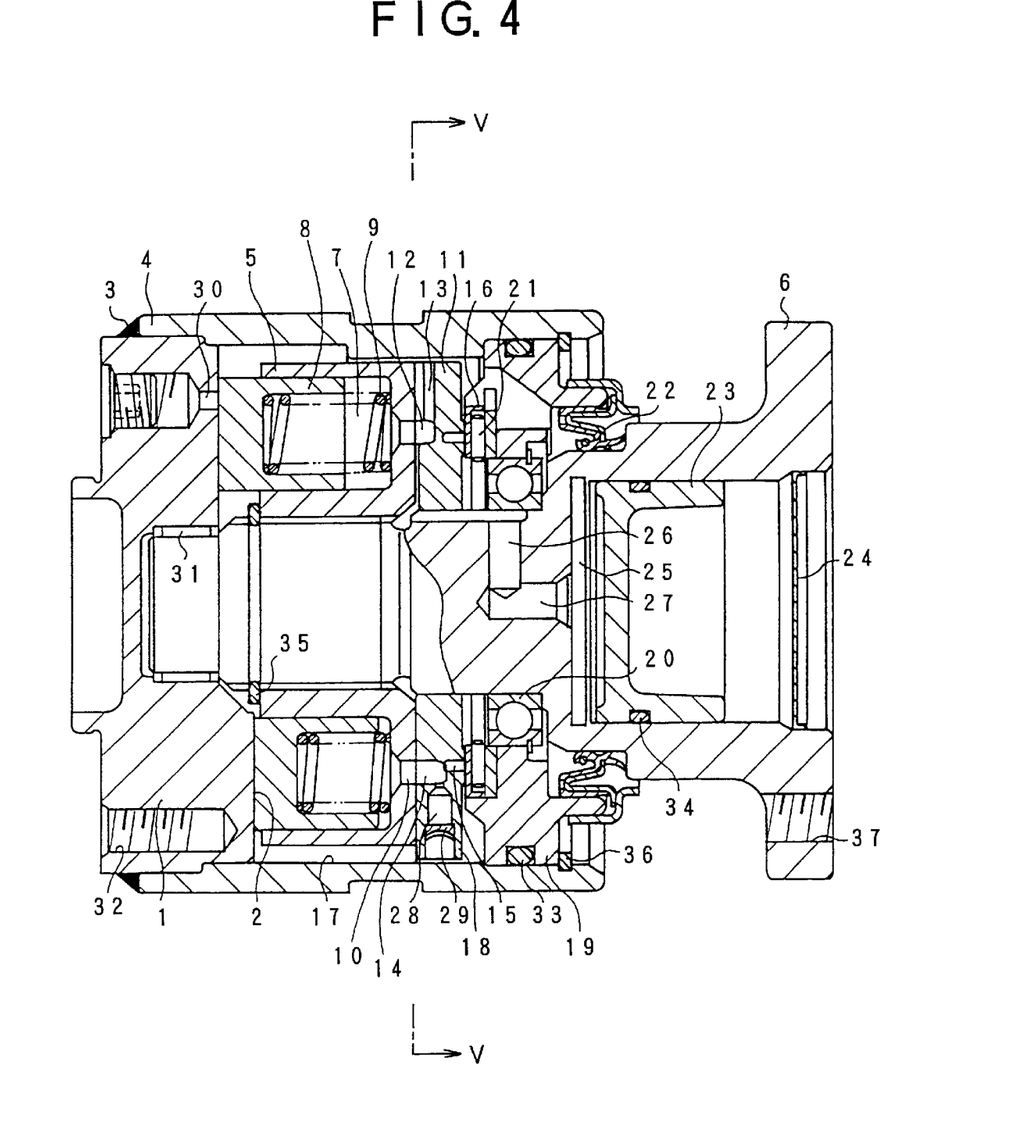
FIG. 4 is a sectional view of a joint which is an embodiment of the present invention.

FIG. 4 is an axial sectional view showing an embodiment of the present invention. A cam1 is provided with a cam face 2 having two or more raised portions formed on its internal side, the cam 1 being coupled to an output shaft not shown for rotations in conjugation with the output shaft. The cam 1 is fixedly secured at a weld 3 to a cam housing 4 so as to rotate together with the cam housing 4. A rotor 5 is rotatably housed in the cam housing 4 and is coupled to an input shaft 6 for rotations in conjunction with the input shaft 6. The rotor 5 is provided axially with a plurality of plunger chambers 7 which accommodate a plurality of plungers 8 slidably by way of return springs 9. The rotor 5 is further provided with a plurality of intake/discharge holes 10 which lead to the plunger chambers 7. A rotary valve 11 has, on its front face, intake ports 12, intake passages 13 and discharge ports 14. The rotary valve 11 has, on its rear face, communication grooves 15 which open to the discharge ports 14. The rear face of the rotary valve 11 is provided with a cover member 16 in an intimate contact manner for shutting off the communication grooves 15. The rotary valve 11 has also a positioning protrusion 18 to be engaged with a notch 17 formed in the inner periphery of the cam housing 4. The rotary valve 11 serves as a timing member for determining the timing to open or close the intake/discharge holes 10, with the notch 17 and the protrusion 18 making up a positioning mechanism for defining the phase relationship between the cam 1 and the rotary valve 11. When the plungers 8 are in their intake strokes, a positional relationship is established in which the intake ports 12 of the rotary valve 11 communicate with the intake/discharge holes 10 of the rotor 5, allowing oil to flow into the plunger chambers 7 through orifices which will be described later, the intake ports 12, the intake passages 13 and the intake/discharge holes 10. When the plungers 8 are in their discharge strokes, a reverse relationship to the intake strokes is established in which the intake/discharge holes 10 of the rotor 5 lead via the discharge ports 14 of the rotary valve 11 to the communication grooves 15.

A bearing retainer 19 rotates jointly with the cam housing 4 and provides a support to the input shaft 6 by way of a bearing 20. A thrust needle bearing 21 intervenes between the bearing retainer 19 and the rotary valve 11. The friction torque associated with the thrust needle bearing 21 is set to be smaller than the friction torque between the rotor 5 and the rotary valve 11. Thus, when the direction of the differential rotations changes, the rotary valve 11 is rotated together with rotor 5 until the positioning protrusion 18 of the rotary valve 11 abuts against the notch 17 of the cam housing 4, after which the rotary valve rotates jointly with the cam housing 4. This allows the intake/discharge holes 10 to compulsorily be switched at a predetermined timing upon the forward rotations and upon the reverse rotations. An oil seal 22 is interposed between the bearing retainer 19 and the input shaft 6, with the input shaft 6 accommodating slidably therein an accumulator piston 23 for absorbing any thermal expansion and shrinkage of oil. The cover member 24 serves to prevent muddy water from entering an O-ring sliding portion in an accumulator chamber 25. The accumulator chamber 25 communicates with the interior of the joint by way of oil passages 26 and 27. The rotary valve 11 is provided with a high pressure chamber 28 which leads to the discharge ports 14 and of which exit is blocked by a plug 29. Further provided are an oiling hole 30, a needle bearing 31, a threaded hole 32, O-rings 33, 34, snap rings 35, 36 and a mounting hole 37.

Figure 5:
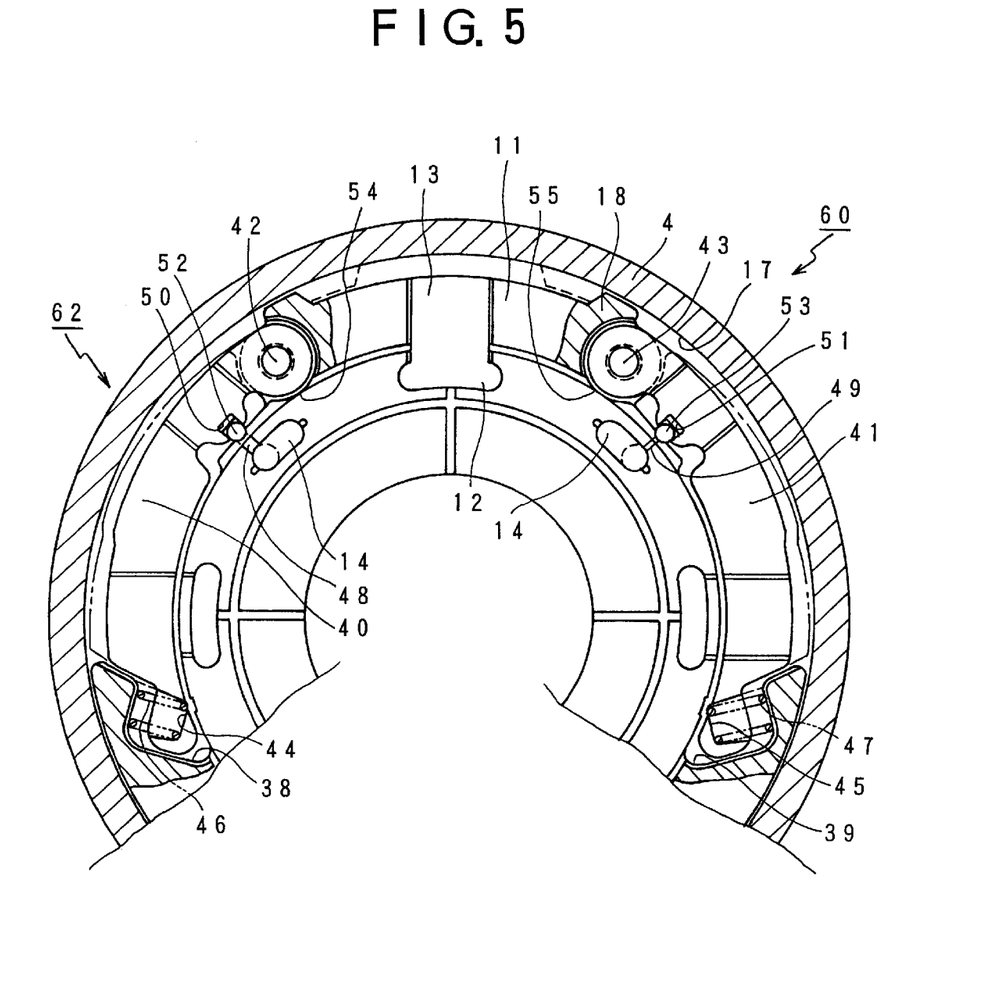
FIG. 5 is a partially sectional view taken along a line V—V of FIG. 4.

FIG. 5 is a partially sectional view of the rotary valve 11 taken along a line V—V of FIG. 4. The rotary valve 11 within the cam housing 4 of the hydraulic power transmission joint comprises a first torque characteristic shifting mechanism 60 and a second torque characteristic shifting mechanism 62. The first torque characteristic shifting mechanism 60 includes an accommodation hole 39, a weight member 41, a drain hole 49, a ball 53 and a spring 47. The second torque characteristic shifting mechanism 62 includes an accommodation hole 38, a weight member 40, a drain hole 48, a ball 52 and a spring 46. The first torque characteristic shifting mechanism 60 serves to set a torque characteristic switching vehicle velocity V1 (a vehicle velocity at which a first rotational-speed difference is acquired) by means of the spring 47 urging the end of the first weight member 41. The second torque characteristic shifting mechanism 62 serves to set a vehicle velocity V2 (a vehicle velocity at which a second rotational-speed difference is acquired) higher than the torque characteristic switching vehicle velocity V1 by means of the spring 46 urging the end of the weight member 40.

Description will be made in greater detail. The rotary valve 11 is rotatably housed in the cam housing 4 of the hydraulic power transmission joint. The notch 17 is formed in the inner periphery of the cam housing 4 for engagement with the protrusion 18 formed on the outer periphery of the rotary valve 11. The discharge ports 14 and the intake ports 12 are alternately formed in the rotary valve 11, the intake ports 12 being in communication with the intake passages 13 which extend up to the outer peripheral face of the rotary valve 11. The two accommodation holes 38 and 39 are formed at the outer periphery of the rotary valve 11 outside the discharge ports 14 and the intake ports 12. The accommodation holes 38 and 39 are provided in the shape of circumferentially elongated holes. The weight members 40 and 41 are accommodated in the accommodation holes 38 and 39, respectively, in such a manner as to be radially (centrifugally) rockable around centers of rotation 42 and 43. The weight members 40 and 41 have curved bottoms corresponding to those of the accommodation holes 38 and 39, respectively. The weight members 40 and 41 have curved tops and are formed with spring accommodation holes 44 and 45, respectively, at the opposite ends to the centers of rotations 42 and 43. The drain holes 48 and 49 are interposed between the accommodation holes 38, 39 and the discharge ports 14 such that the discharge ports 14 can communicate with the accommodation holes 38 and 39 by way of the drain holes 48 and 49, respectively. Confronting the exits of the drain holes 48 and 49, the weight members 40 and 41 have accommodation grooves 50 and 51, respectively, formed in their bottoms. The accommodation grooves 50 and 51 accommodate the balls 52 and 53, respectively, which normally block the drain holes 48 and 49, respectively. Predetermined gaps 54 and 55 are formed between the weight members 40 and 41 and the accommodation holes 38 and 39, respectively. The torque characteristic shifting mechanisms are constituted of the accommodation holes 38 and 39, the weight members 40 and 41, the drain holes 48 and 49, the balls 52 and 53, and the springs 46 and 47, respectively. The springs 46 and 47 bias the respective ends of the weight members 40 and 41, respectively, by predetermined spring forces. Although the drain holes 48 and 49 are blocked by the balls 52 and 53 accommodated in the accommodation grooves 50 and 51 formed in the bottoms of the weight members 40 and 41, the area of contact of the ball 52 on one hand with the drain hole 48 is formed so as to be larger than the area of contact of the ball 53 on the other with the drain hole 49. Therefore, when a predetermined vehicle velocity V1 is reached and the weight member 41 rocks in the centrifugal direction by the centrifugal force, the ball 53 opens the drain hole 49. When the vehicle velocity further reaches a certain predetermined value V2 higher than the predetermined vehicle velocity and the weight member 40 rocks in the centrifugal direction, the ball 52 opens the drain 48. The torque is thus varied in a stepwise manner.

Figure 6:
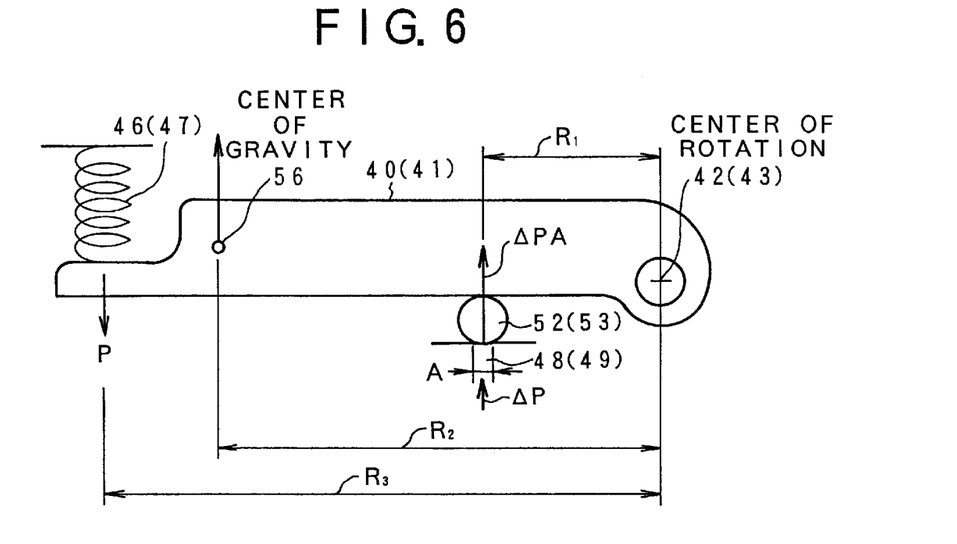
FIG. 6 is an explanatory diagram of a moment mechanism provided by a weight member.
Figure 7:
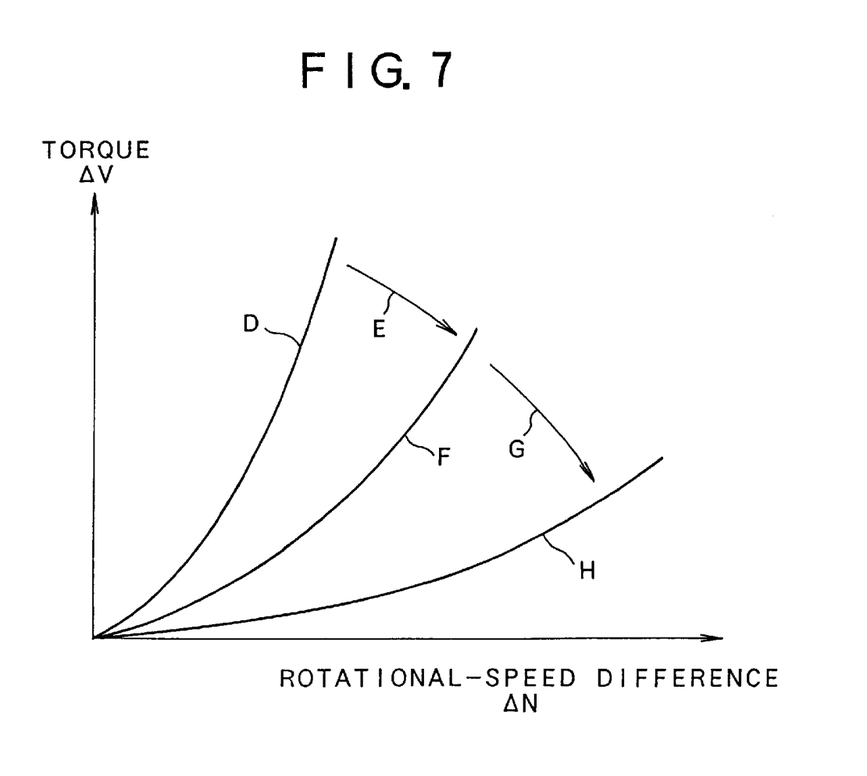
FIG. 7 is a graphical representation showing torque characteristics.

FIG. 6 shows the second torque characteristic shifting mechanism 62 in an exclusive manner, with the reference numerals parenthesized for the first torque characteristic shifting mechanism 60. FIG. 7 illustrates the balance of points at which the torque characteristics are changed over in the torque characteristic shifting mechanism of FIG. 6.

In the torque characteristic shifting mechanism of FIG. 6, the weight member 40 (41) rocks in the centrifugal direction around the center of rotation 42 (43). With the ball 52 (53) blocking the drain hole 48 (49), let A and $\Delta P$ be the area of contact of the ball 52 (53) with the drain hole 48 (49) and the discharge pressure, then $\Delta \cdot A$ acts on the weight member 40 (41) as a thrust-up force lifting the weight member 40 (41). The spring 46 (47) presses the end of the weight member 40 (41) by a spring force P. Let R1, R2 and R3 be the distance from the center of rotation 42 (43) to the center of the ball 52 (53), the distance from the center of rotation 42 (43) to the center of gravity 56 of the weight member 40 (41) and the distance from the center of rotation 42 (43) to the center of the spring 46 (47), then the balance is given as $$R3 \cdot P - R2 \cdot m \cdot r \cdot \omega^2 - R1 \cdot \Delta P \cdot A = 0$$

Herein, if the vehicle velocity is zero with R3≈R2>R1 or R2>R3>R1, then $$R3 \cdot P = R1 \cdot \Delta P \cdot A$$

$$P = (R1/R3) \Delta P \cdot A$$

result. In order to obtain the same performances as the prior art, the spring force P of the spring 46 (47) can be R1/R3, thus enabling the space for accommodating the springs 46 (47) to be reduced to a great extent.

If $\Delta P \cdot A$ is constant (=C), then $$R3 \cdot P - R2m \cdot r \cdot \omega^2 - R1 \cdot C = 0$$

$$\omega^2 = (R3 \cdot P - R1 \cdot C)/R2 \cdot m \cdot r$$

result. When P is constant, the mass m can be R1/R2 for fulfilling the requirement to increase the contact area A. It is thus possible to reduce the external diameter and the overall length of the joint and to achieve a significant reduction in size.

The operative functions will then be described. When no rotational-speed difference lies between the cam 1 and the rotor 5 in FIG. 4, the plunger 8 does not work, resulting in no torque transmission. At that time, the plungers 8 are pressed against the cam face 2 by the action of the return springs 9. Then, when a rotational-speed difference arises between the cam 1 and the rotor 5 with the increase of the vehicle velocity, the plungers 8 in their discharge strokes are axially thrust in by the cam face 2 of the cam 1. At that time, the intake/discharge ports 10 are in communication with the discharge ports 14, so that the plungers 8 displace oil in the plunger chambers 7 from the intake/discharge holes 10 to the discharge ports 14 of the rotary valve 11. The oil displaced to the discharge ports 14 is fed through the orifices and then through the intake passages 13 into the intake ports 12. Due to the resistance of the orifices at that time, the oil pressures in the discharge ports 14 and in the plunger chambers 7 will rise, resulting in the occurrence of reaction forces in the plungers 8. One rotation of the cam 1 against these plunger reaction forces allows the occurrence of torque and the torque transmission between the cam 1 and the rotor 5. It will be appreciated that the discharge ports 14 are in communication with one another by way of the communication grooves 15, all the plunger chambers 7 in their discharge strokes have the same oil pressure. A further rotation of the cam 1 causes the intake strokes, allowing the intake/discharge holes 10 to communicate with the intake ports 12, with the result that the oil in the intake passages 13 is taken through the intake ports 12 and the intake/discharge holes 10 into the plunger chambers 7 so that the plungers 8 are returned along the cam face 2 of the cam 1.

In the event that the vehicle velocity V does not reach the certain value V1, the centrifugal force will not reach a predetermined value either, with the result that any torque reduction will not occur. That is, if the vehicle velocity V does not reach the certain value V1, then the centrifugal forces acting on the weight members 40 and 41 will be smaller than the spring forces of the springs 46 and 47, so that the weight members 40 and 41 will not rock. For this reason, the drain holes 48 and 49 remain blocked by the balls 52 and 53. Thus, the torque characteristic at this time results in a normal torque characteristic in the form of a curve D of FIG. 7. When the vehicle velocity V exceeds the certain value V1, the centrifugal force will increase, but due to the same springs forces P of the springs 46 and 47, the same discharge pressures $\Delta P$, the same distances R1, R2 and R3, the ball 53 opens the drain holes 49 having a smaller contact area. Thus, the torque $\Delta T$ shifts downward as shown in an arrow E of FIG. 7, resulting a torque characteristic in the form of a curve F. Furthermore, when the vehicle velocity exceeds the predetermined value V2, the centrifugal force will increase and the ball 52 will open the drain hole 48 having a larger contact area. For this reason, the torque $\Delta T$ further shifts downward as shown in an arrow G of FIG. 7, resulting in a torque characteristic in the form of a curve H. By virtue of such a two-part arrangement of the first and second torque characteristic shifting mechanisms 60 and 61, it is possible to change over the torque characteristics at thee stages and therefore to prevent any variances in vehicle behaviors arising from torque variations.

Furthermore, since $R3 \approx R2 > R1$ or $R2 > R3 > R1$ where R1, R2 and R3 are the distance from the center of rotation 42, 43 to the center of the ball 52, 53, the distance from the center of rotation 42, 43 to the center of gravity 56 of the weight member 40, 41 and the distance from the center of rotation 42, 43 to the center of the spring 46, 47, respectively, the same performances as the prior art can be obtained by the spring force equal to R1/R3 when the vehicle velocity V is zero. The spring accommodation space can thus be reduced to a great extent, achieving a reduction in size of the joint.

As set forth hereinabove, according to the present invention, the distances are set so as to meet the relationships $R3 \approx R2 > R1$ or $R2 > R3 > R1$ where R1, R2 and R3 are the distance from the center of rotation of the weight member to the center of the ball blocking the drain hole, the distance from the center of rotation to the center of gravity of the weight member and the distance from the center of rotation to the center of the spring, respectively, R1/R3 will suffice for the spring force when the vehicle velocity is zero in order to obtain the same performances as the prior art, whereupon the spring accommodation space can be reduced to a great extent, achieving a reduction in size of the joint. Furthermore, R1/R2 will suffice for the mass of the weight member R2 when the thrust-up force lifting the ball is constant, so that the external diameter and the overall length can be reduced to a great extent, achieving a reduction in size of the joint. Moreover, the provision of a plurality of torque characteristic shifting mechanisms allows the torque characteristics to vary in a stepwise manner, thus preventing any variances in vehicle behaviors arising from torque variations.

Although the above embodiment has employed two torque characteristic shifting mechanisms for the three-step switching by way of example, three or more torque characteristic shifting mechanisms could be provided for further multi-step switching.

It will be appreciated that the present invention covers any appropriate variants without impairing its objects and advantages and that it is not restricted by the numerical values shown in the embodiment.

What is claimed is:

1. A hydraulic power transmission joint for transmitting torque in response to a rotational-speed difference between input and output shafts capable of relative rotations, said joint comprising:

a cam housing interposed between said input and output shafts and coupled to one of said shafts, said cam housing being provided with a cam face having two or more raised portions formed on its internal side;

a rotor coupled to the other of said shafts and rotatably housed in said cam housing, said rotor having a plurality of axially extending plunger chambers;

a plurality of plungers each reciprocatively accommodated in each of said plurality of plunger chambers under a pressing force of a return spring, said plurality of plungers being operated by said cam face upon said relative rotations of said two shafts;

an intake/discharge hole formed in said rotor and leading to said plurality of plunger chambers;

a rotary valve being in rotatable sliding contact with an end face of said rotor, said rotary valve being positioned relative to said rotor in a predetermined relationship, said rotary valve having on its surface a plurality of intake ports and a plurality of discharge ports acting respectively as intake valves and discharge valves depending on a positional relationship relative to said intake/discharge hole;

an orifice generating a flow resistance as a result of flow of oil discharged by the operation of said plungers; and a torque characteristic shifting mechanism for changing over torque transmission characteristics in a stepwise manner depending on a rotational-speed difference between said two shafts;

said torque characteristic shifting mechanism including:

an accommodation hole formed outside of said discharge ports of said rotary valve;

a weight member received in said accommodation hole rockably around a center of rotation by the action of a centrifugal force;

a drain hole for allowing a communication between said accommodation hole and said discharge ports;

a ball located under said weight member for blocking said drain hole, said ball serving to open said drain hole when said weight member rocks by a centrifugal force; and a spring for urging the end portion of said weight member opposite to said center of rotation, said spring setting a predetermined rotational-speed difference as a torque characteristic changeover point.

2. A hydraulic power transmission joint according to claim 1, wherein said torque characteristic shifting mechanism sets the distances so as to meet a relationship $R3 \approx R2 > R1$ where R1, R2 and R3 are the distance from said center of rotation to a center of said ball, the distance from said center of rotation to a center of gravity of said weight member and the distance from said center of rotation to a center of said spring, respectively.

3. A hydraulic power transmission joint according to claim 1, wherein said torque characteristic shifting mechanism sets the distances so as to meet a relationship $R2 > R3 > R1$ where R1, R2 and R3 are the distance from said center of rotation to a center of said ball, the distance from said center of rotation to a center of gravity of said weight member and the distance from said center of rotation to a center of said spring, respectively.

4. A hydraulic power transmission joint according to claim 1, wherein it comprises a plurality of torque characteristic shifting mechanisms each consisting of said accommodation hole, said weight member, said drain hole, said ball and said spring, so as to change over torque transmission characteristics at three or more steps in response to a rotational-speed difference between said two shafts.

5. A hydraulic power transmission joint according to claim 4, wherein it comprises:

a first torque characteristic shifting mechanism consisting of a first accommodation hole, a first weight member, a first drain hole, a first ball and a first spring; and a second torque characteristic shifting mechanism consisting of a second accommodation hole, a second weight member, a second drain hole, a second ball and a second spring, and wherein said first torque characteristic shifting mechanism sets a first rotational-speed difference at which the torque characteristic is changed over by the action of said first spring pressing the end portion of said first weight member, and wherein said second torque characteristic shifting mechanism sets a second rotational-speed difference higher than said first rotational-speed difference, at which the torque characteristic is changed over by the action of said second spring pressing the end portion of said second weight member.

6. A hydraulic power transmission joint according to claim 1, wherein said input and output shafts are front and rear shafts of a motor vehicle equipped with tires having different diameters, and wherein said joint generates torque as a function of a rotational-speed difference between said shafts, said rotational-speed difference increasing accordingly as the vehicle velocity increases.

* * * * *